US007917713B2

(12) United States Patent
Elliott et al.

(10) Patent No.: US 7,917,713 B2
(45) Date of Patent: Mar. 29, 2011

(54) OPTIMIZED DATA MIGRATION WITH A SUPPORT PROCESSOR

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/613,858

(22) Filed: Dec. 20, 2006

(65) Prior Publication Data
US 2008/0155218 A1 Jun. 26, 2008

(51) Int. Cl.
*G06F 12/00* (2006.01)
(52) U.S. Cl. ............ 711/162; 714/6; 711/E12.094
(58) Field of Classification Search .......... 711/162; 714/6
See application file for complete search history.

(56) References Cited

U.S. PATENT DOCUMENTS

| | | | |
|---|---|---|---|
| 6,035,412 A * | 3/2000 | Tamer et al. .......... 714/6 |
| 6,530,004 B1 | 3/2003 | King et al. | |
| 2004/0059882 A1* | 3/2004 | Kedem et al. ........ 711/162 |
| 2004/0068612 A1* | 4/2004 | Stolowitz ............. 711/114 |
| 2004/0210677 A1 | 10/2004 | Ravindran et al. | |
| 2006/0106947 A1 | 5/2006 | Benhase et al. | |

FOREIGN PATENT DOCUMENTS

| CN | 1624670 A | 8/2005 |
|---|---|---|
| EP | 0715249 A2 | 6/1996 |

OTHER PUBLICATIONS

Office Action dated Jun. 26, 2009 from Chinese counterpart application 200710192740.
Office Action dated Dec. 18, 2009 from Chinese counterpart Application No. 200710192740.

* cited by examiner

*Primary Examiner* — Reginald G Bragdon
*Assistant Examiner* — Hamdy S Ahmed
(74) *Attorney, Agent, or Firm* — Griffiths & Seaton PLLC (57) ABSTRACT

A system migrates data between a source device and a target device in a storage system. A processor is operational within a local domain of the storage system. A redundant array of independent disks (RAID) controller electrically connected to the processor. The RAID controller divides a capacity of the source device into a plurality of sub-regions, locks the sub-regions from storage activity, establishes a mirroring relationship for write data updates between the source device and target device, and assigns the processor to copy data from the source device to the target device. A method of migrating data includes dividing a capacity of a source device into a plurality of sub-regions, locking the sub-regions from storage activity, establishing a mirroring relationship for write data updates between the source device and a target device, and assigning a local processor to copy data from the source device to the target device.

17 Claims, 8 Drawing Sheets

OPTIMIZED DATA MIGRATION WITH A SUPPORT PROCESSOR

BACKGROUND OF THE INVENTION

1. Field of the Invention

The present invention relates in general to computers, and more particularly to a system and method of optimized data migration with a support processor in storage systems.

2. Description of the Prior Art

Data storage systems are used to store information provided by one or more host computer systems. Such data storage systems receive requests to write information to a plurality of data storage devices and requests to retrieve information from that plurality of data storage devices. It is known in the art to configure the plurality of data storage devices into two or more storage arrays.

Storage systems provide high availability and reliability characteristics through architectural design implementations that provide redundancy to protect the system. Fault tolerance is achieved in systems via redundant fault tolerant hardware designs and user data is stored in arrays of storage devices configured in a redundant array of independent disks (RAID) scheme. Traditional RAID schemes (RAID levels 1, 2, 3, 4, 5, 10 [0+1, 1+0]) provide a single level of redundant protection and are tolerant of a single device failure prior to being exposed to data loss from an additional failure. Online RAID array repair, generally known as "hot sparing", restores RAID array redundancy following a failure of a storage device.

There are scenarios where an array repair action (sparing activity) results in a less-than-optimum configuration of the RAID array. In some cases, it may be desirable to replace/migrate a RAID array member storage device of a configuration. Examples of such cases include a RAID array repair action (sparing activity) resulting in an intermix of storage device types with a less-than-optimal configuration. The intermix of storage devices can include such non-aligned characteristics as a device capacity mismatch, device performance characteristics, including speed (RPM) and interface rate, device reliability characteristics such as enterprise class, near-line class, and desktop class, and storage device network position. In addition to the foregoing characteristics, a multi-storage device service boundary may result in data migration to create an acceptable service boundary.

To migrate the data from an active RAID array member (source) to a new target device, it is desirable to perform some sort of copying activity to migrate the data from source to target rather than forcing the RAID array into a rebuild of the device that is desired to be migrated to the new device. Prior art includes the RAID controller forming a RAID 1 relationship between the source and target device and performing a mirror rebuild to synchronize the data between the source and target devices. This method requires significant RAID controller and storage device fabric resources to complete. The resources consumed by the RAID controller and storage device network fabric impact the overall system performance during the duration of a particular activity.

SUMMARY OF THE INVENTION

Thus, a need exists for a system and method for migration of data which minimizes the use of system resources as described. The system and method should make use of existing storage devices and network fabrics to provide for an efficient, cost-effective solution.

In one embodiment, the present invention is a method of migrating data from a source device to a target device in a storage system, comprising dividing a capacity of the source device into a plurality of sub-regions, locking the sub-regions from storage activity, establishing a mirroring relationship for write data updates between the source device and target device, assigning a local processor to copy data from the source device to the target device, reading data from one of the plurality of sub-regions by the local processor, and writing data to an identical location on the target device by the local processor.

In another embodiment, the present invention is a system for data migration between a source device and a target device in a storage system, comprising a processor operational within a local domain of the storage system, and a redundant array of independent disks (RAID) controller electrically connected to the processor, wherein the RAID controller divides a capacity of the source device into a plurality of sub-regions, locks the sub-regions from storage activity, establishes a mirroring relationship for write data updates between the source device and target device, and assigns the processor to copy data from the source device to the target device.

In another embodiment, the present invention is an article of manufacture including code for migrating data from a source device to a target device in a storage system, wherein the code is capable of causing operations to be performed comprising dividing a capacity of the source device into a plurality of sub-regions, locking the sub-regions from storage activity, establishing a mirroring relationship for write data updates between the source device and target device, assigning a local processor to copy data from the source device to the target device, reading data from one of the plurality of sub-regions by the local processor, and writing data to an identical location on the target device by the local processor.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In a RAID storage system, the storage device network fabric consists of devices that require support processors to manage and maintain the operational state of the network. In the case of modular storage systems, the support processors may also be used to manage a modular enclosure's enclosure management services. The enclosure management services support processor can include a SCSI Enclosure Services processor (SESP) that is capable of being an initiator device within the storage device communications network. In storage device communications network fabrics that support a non-blocking switching architecture, it is possible to establish point-to-point communications sessions between initiator and target devices that are non-disruptive to the network such that multiple initiator target communication sessions can be established in parallel.

The present invention takes advantage of this characteristic and utilizes a local processor such as an SESP processor to cooperatively participate in the data migration from a redundant array of independent disks (RAID) array member source to an eligible target device. The SESP at the direction of the RAID controller reads data from the RAID array source device and copies (writes) the data to the target device of the migration relationship.

RAID resources are used to manage and control the progress of the data copy between the source and target storage devices (master process) such that the storage system and various subcomponents of the storage system are made aware of where the SESP is at in the subordinate process of data copy migration. RAID controller resources are also used to establish and maintain a mirroring relationship between the source and target device such that the RAID controller updates the devices with newly modified data during a data migration operation.

Figure 1:
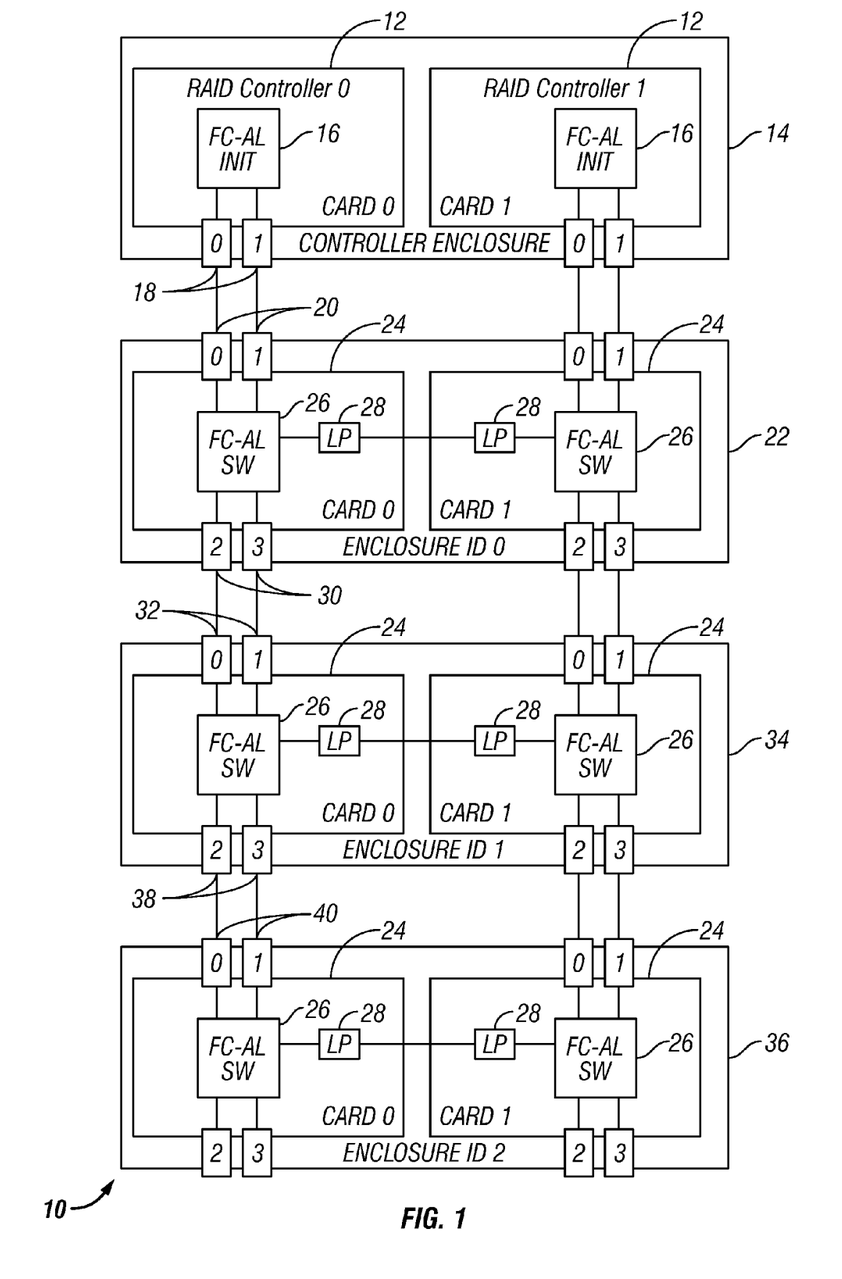
FIG. 1 illustrates an example storage system with dual redundant array of independent disks (RAID) controllers.

Turning to FIG. 1, an example storage system 10 with dual RAID controllers 12 connected to storage devices via a Fibre Channel Arbitrated Link (FC-AL) storage device interconnect fabric that implements non-blocking FC-AL switches. RAID controllers 12 are enclosed by controller enclosure 14. Integrated into controller enclosure 14 are two controller cards 0 and 1 which contain a FC-AL initiator device 16. Device 16 includes downstream ports 18 denoted as 0 and 1, which communicate with upstream ports 20 of switch enclosure 22, here labeled as enclosure ID 0. Enclosure 22 also contains two FC-AL cards 24, housing a FC-AL switch 26 and a local processor 28 such as a SESP processor 28, the processors 28 connected to each other. The downstream ports 30 (here labeled 2 and 3) of enclosure 22 are then daisy chained to the upstream ports 32 (labeled 0 and 1) of enclosure 34, which houses the same subcomponents as found in enclosure 22. In similar fashion, enclosure 36 also includes the same subcomponents as found in enclosure 22, with upstream ports 40 (labeled again 0 and 1) connected to downstream ports 38. Each enclosure (e.g., 22, 34, 36) provides two controller cards 24 that provide a FC-AL switch 26 and a local processor 28 (e.g., SESP) that is FC-AL initiator capable and has access to the FC-AL storage device network via the FC-AL switch 26.

It should be noted that the controller enclosure 14 as depicted in FIG. 1 can also be a logical construct. The controller function with redundant RAID engines can exist in separate physical entities that are logically joined together in a storage controller function in addition to the single physical entity depicted in FIG. 1. One skilled in the art can appreciate the various embodiments in which the controller function and accompanying RAID capabilities can be realized.

A master RAID controller manages the copy (migration) process of the local processors (e.g., SESPs) as follows: The master RAID controller first divides a source storage device capacity (Logical Block Address, LBA range) into multiple sub-regions, or sub-LBA ranges. The master RAID controller informs the peer RAID controller, if applicable, of the sub-regions being assigned to the SESPs to copy. The RAID controller initiators then put a lock on the sub-regions from further storage activity. In parallel, the RAID controllers establish a mirroring relationship for write data updates between the source device and target device of the data copy operation. The RAID controllers will write data to the source device for all writes and only to the target device of the copy relationship when data is targeted to an area of the target device that has already been copied to the target device by the copy process, thus minimizing the RAID controller resources required to complete the update.

The updated data will be copied to the target device by the copy process when that sub-range is copied from the source to the target by the process. The RAID controller then assigns a SESP in the storage device fabric to copy the data from the source storage device sub-region to the target storage device. The RAID controller can assign one (1) to N SESPs with a specific sub-region to copy from the source to the target device. Optimally, the RAID controller will choose SESPs which provide the best separation and locality to the source and target storage devices to minimize the storage device interconnect resources that are required to complete the copy operation.

In cases where the write data is to be written to the area within a sub-range assigned to a SESP to copy from the source to target devices, the data is updated on the source device and carried as deferred write to the target device. When the SESP reports that it has completed the copy of the sub-region assigned by the RAID controller, the RAID controller completes the deferred writes that it was carrying for the sub-region.

Both devices (source and target storage devices) as well as the SESP device are resident within the FC-AL switches' local port domain to maintain as much of the FC-AL fabric available as possible. This is not required, however. In the disclosed configuration, the utilization of storage device interconnect fabric bandwidth resources is optimal. The SESP processor reads the data from the source device sub-LBA range and writes the data to the target storage device identical location, thus creating a copy of the data image on the source storage device on the target storage device.

Figure 2:
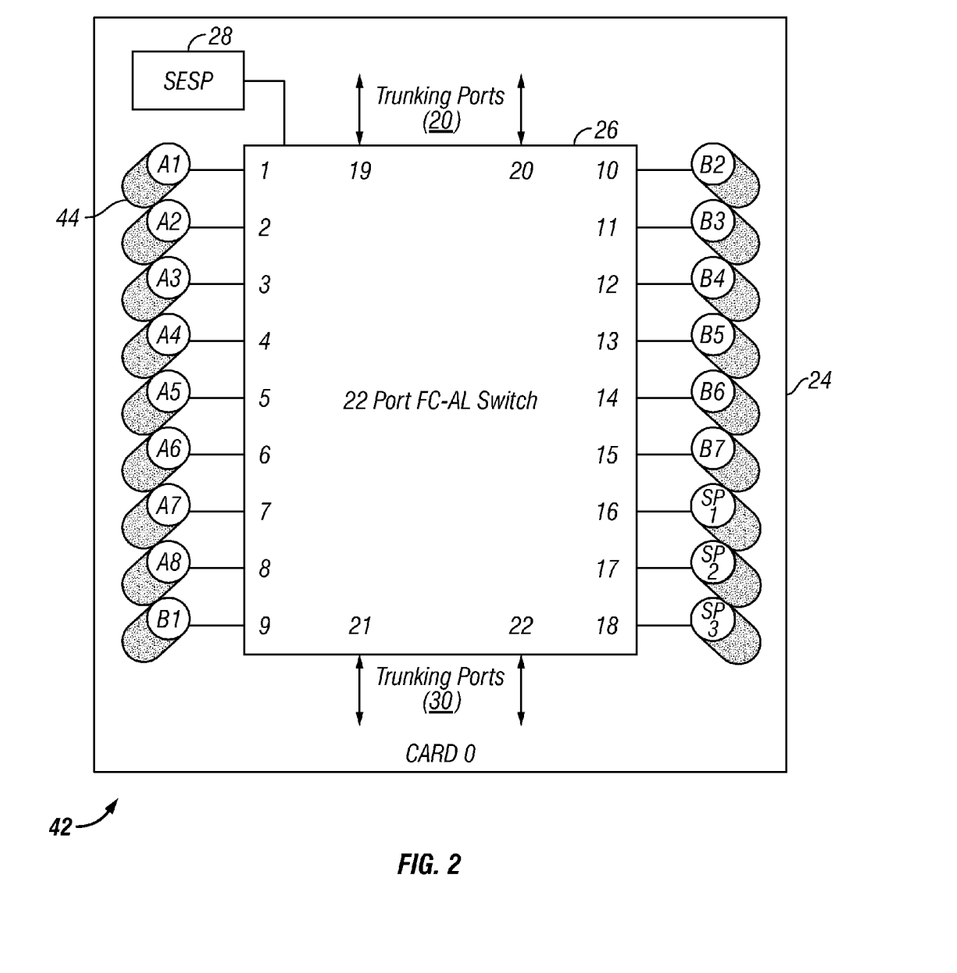
FIG. 2 illustrates a topology implementation using a non-blocking Fibre Channel Arbitrated Loop (FC-AL) switch attaching to a single port of a dual ported storage device or to an input port to a multi-ported multiplexing device that connects a single ported storage device to a FC-AL switch port.

FIG. 2 describes a topology implementation 42 according to the present invention which uses a non-blocking FC-AL switch 26 that attaches to a single port of a dual ported (e.g., upstream ports 20, downstream ports 30) storage device or to an input port to a multi-port multiplexing device that connects a single ported storage device 44 to a FC-AL switch port (e.g., Port 1). The switching device 26 provides the capability to establish port-to-port connections between device ports in a non-blocking fashion. A SESP processor 28 is seen connected to device 26 via a control signal bearing medium. FIG. 2 depicts an example FC-AL card 24 (here labeled card 0) which houses the switch device 26.

Figure 3A:
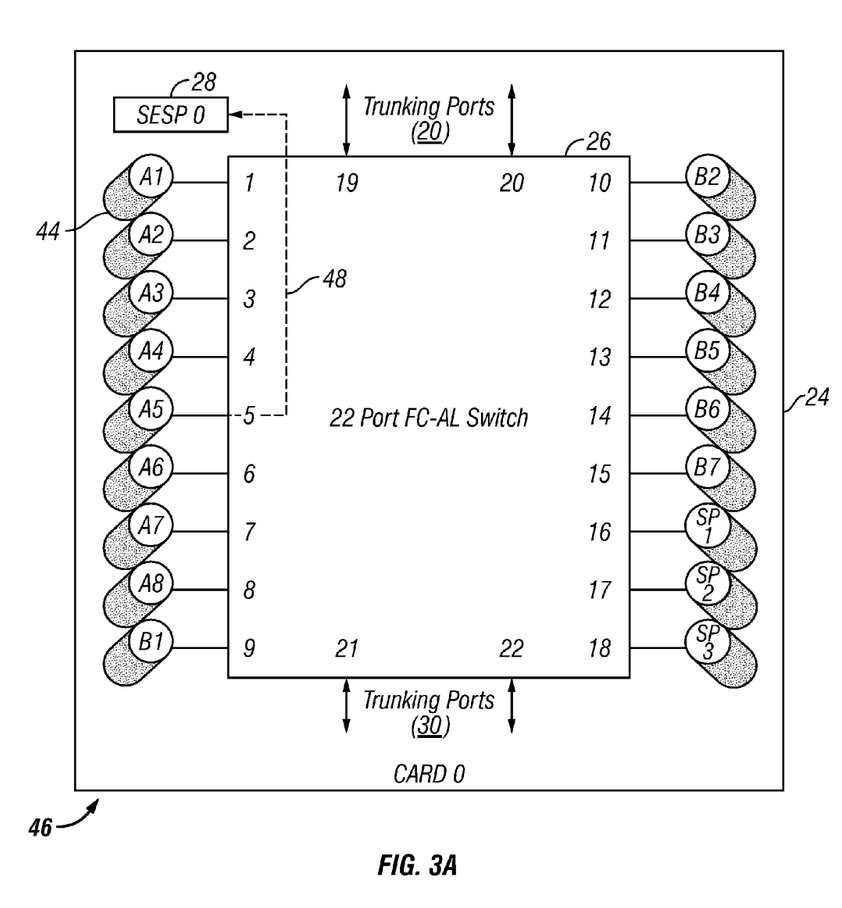
FIGS. 3a, 3b describe internal switch connectivity according to the present invention in a first operation of a storage system.
Figure 3B:
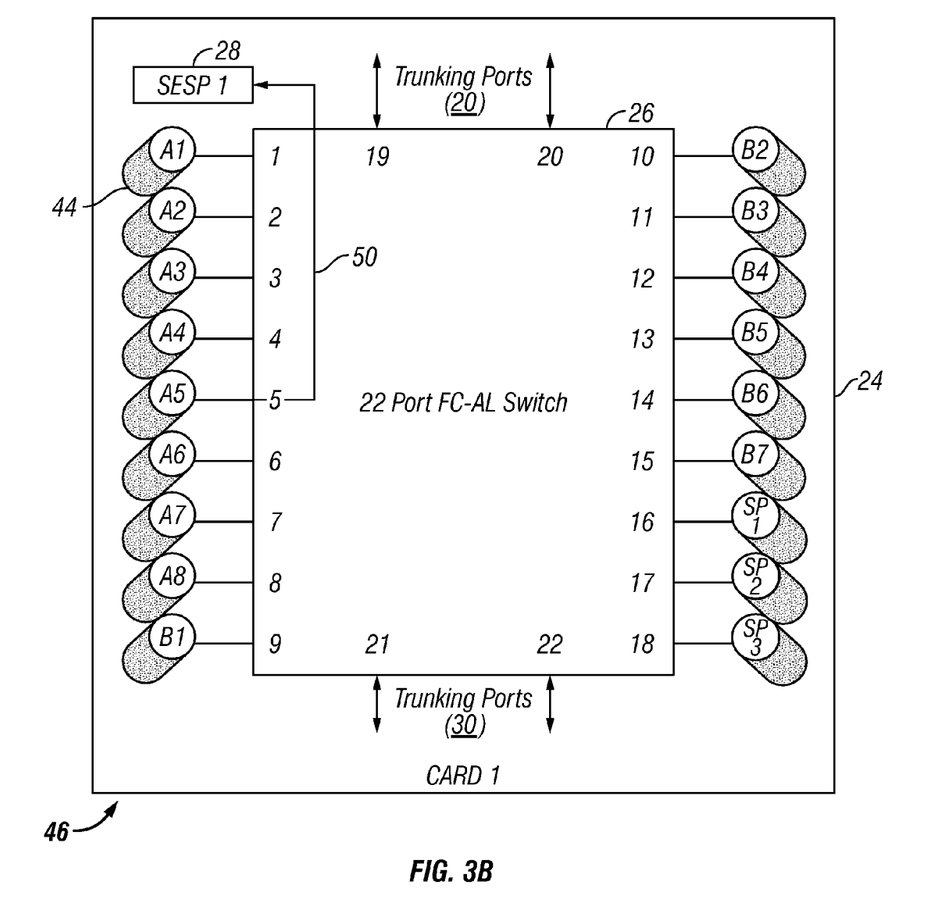

FIGS. 3a and 3b describe the internal switch connectivity for a scenario according to the present invention where a SESP0 processor 28 on card 24 (labeled card 0) and an SESP1 processor 28 on a separate card 24 (labeled card 1) read data from storage device A5 (denoted by dotted line 48) that is connected to Port 5 of the FC-AL switch device 26 as part of a first operation of the storage system. Note that both SESPs 28 [SESP 0 and SESP 1] are depicted reading from the same storage device 44 (A5). The read operation performed with SESP 1 is denoted with solid line 50. The respective read accesses will be in parallel, with the management of the sequence by the storage device 44. In the nominal case, read requests will be interleaved and each SESP 28 will read data on an alternating basis.

Figure 4A:
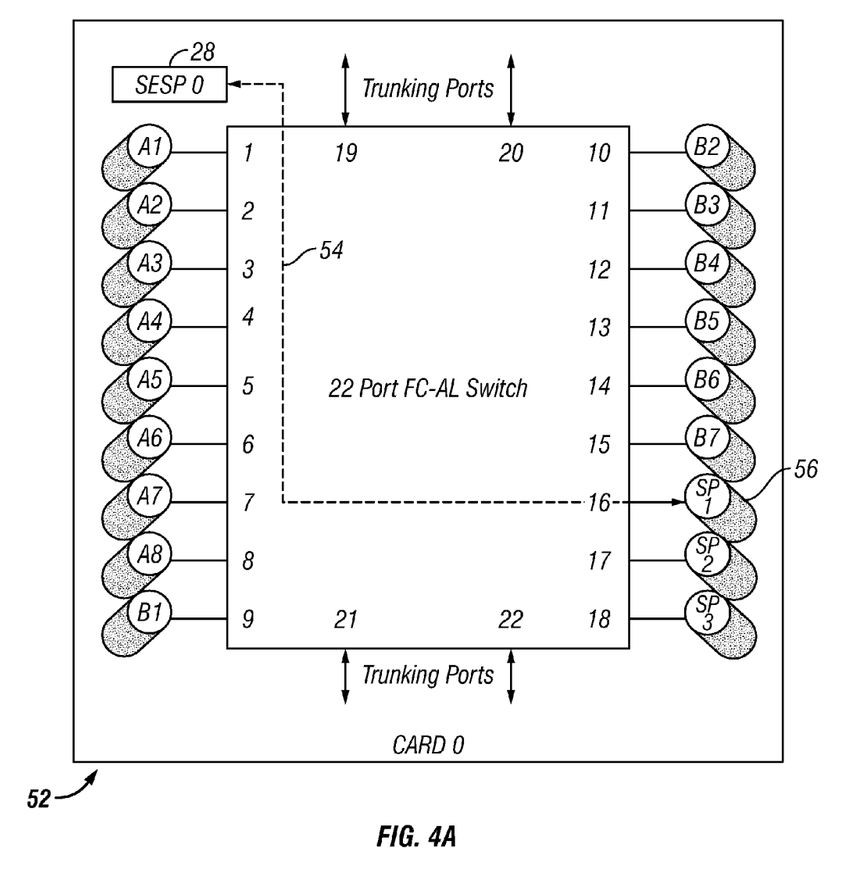
FIGS. 4a, 4b describe internal switch connectivity according to the present invention in a second operation of a storage system.
Figure 4B:
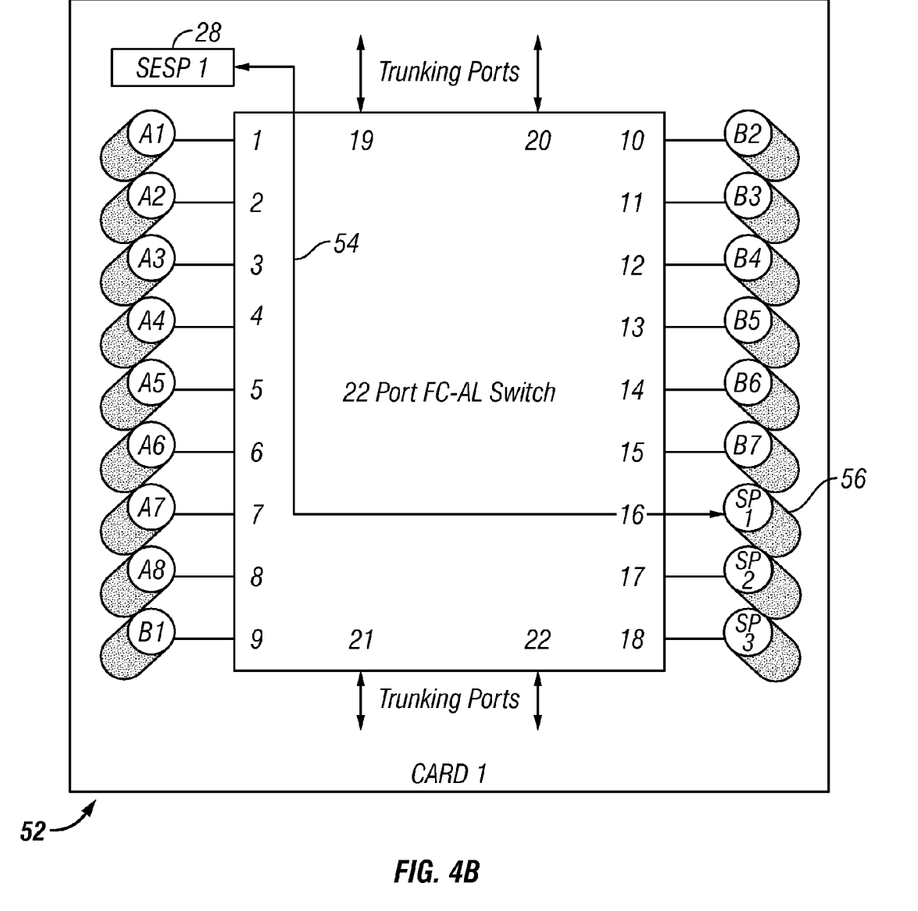

FIGS. 4a and 4b describe the internal switch connectivity for a following operation 52 of a storage system where the SESP0 28 writes data (denoted by dotted line 54) read from storage device A5 sub-LBA region 0 that is connected to Port 5 of the FC-AL switch device 26 to storage device 56 (here denoted SP1) that is connected to Port 16 of the FC-AL switch 26 and in parallel (see FIG. 4b) SESP 1 writes data (denoted by solid line 54) read from storage device A5 sub-LBA region 1 that is connected to Port 5 of the FC-AL switch device 26 to storage device 56 (again denoted SP1) that is connected to Port 16 of the FC-AL switch 26. Here again, note that both SESPs [SESP 0 and SESP 1] are depicted writing to the same storage device 56. As a result, the write accesses are again in parallel. Furthermore, here again, the management of the sequence is performed by the storage device 56. In the nominal case, write operations will also be interleaved and each SESP 28 will write data on an alternating basis.

Figure 5:
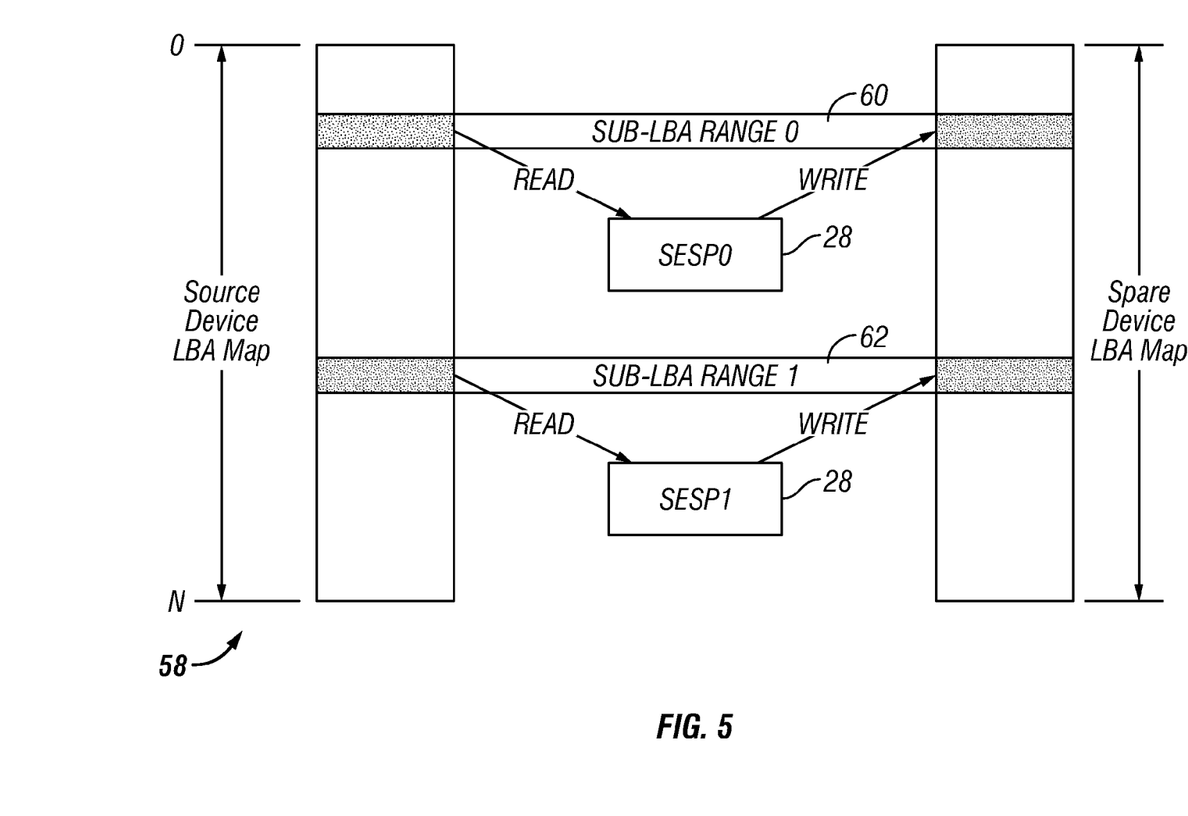
FIG. 5 describes an example migration process from a source storage device to a target storage device according to the present invention.

Turning to FIG. 5, an example illustration of the migration process 58 according to the present invention is depicted. In particular, the process 58 by which the SESPs 28 use to copy data from the source storage device to the target storage device sub-LBA range assigned to it by the RAID Controller. SESP0 reads data from the sub-LBA range 0 of the source storage device and subsequently writes the data to the equivalent sub-LBA range of the target storage device. Each SESP will only read data from the source device and will only write data to the target device within the designated LBA range (e.g., ranges 60, 62) of the storage devices assigned to it by the RAID controller.

Figure 6:
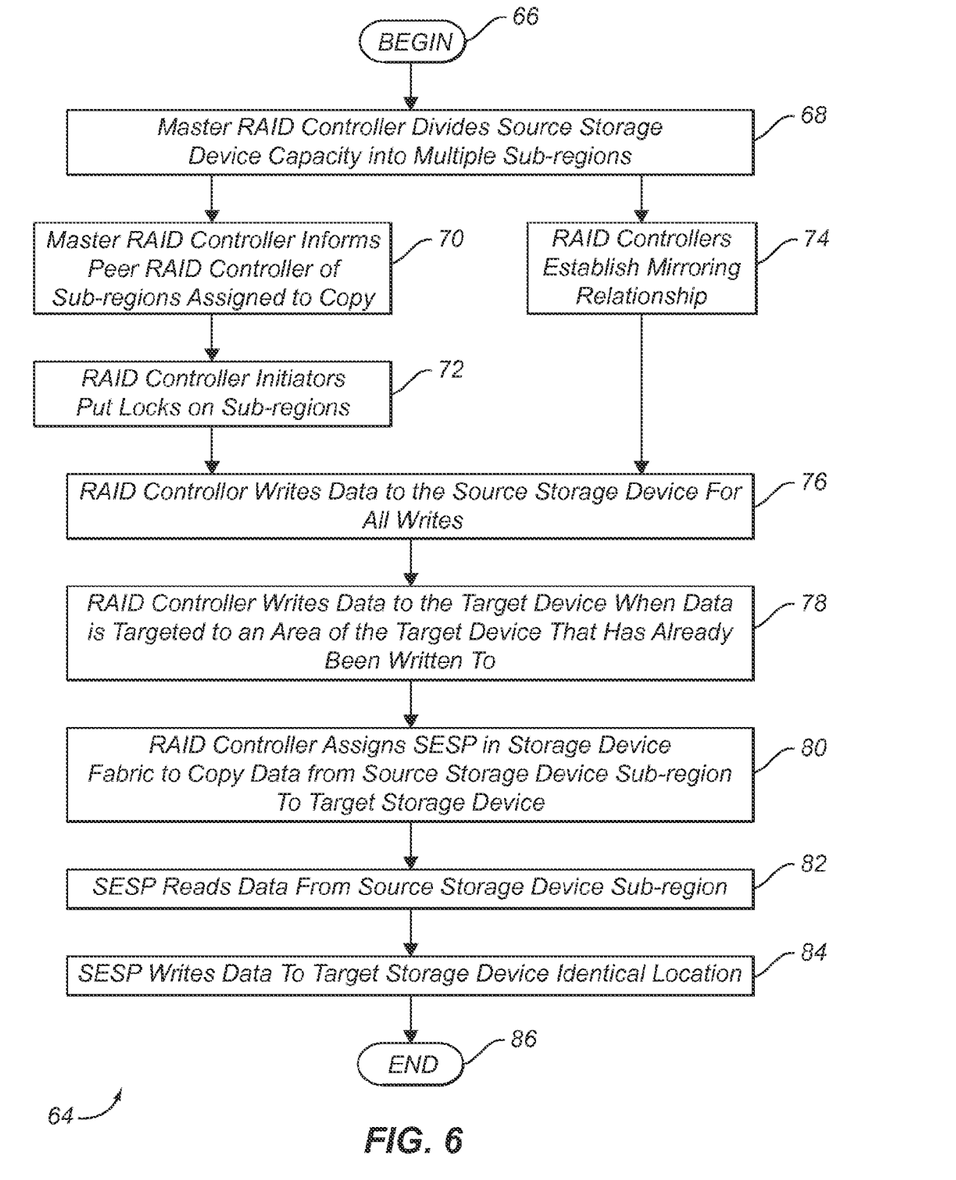
FIG. 6 illustrates an example method of operation of a computer storage system to migrate data from a source storage device to a target storage device according to the present invention.

Turning to FIG. 6, an example migration operation 64 is depicted according to the present invention. The operation begins (step 66) by a master RAID controller dividing applicable source storage devices into multiple sub-regions or sub-LBA regions as previously described (step 68). The following steps 70, 72 and step 74 can be then performed in parallel. In step 70, if applicable, the master RAID controller informs a peer RAID controller of respective sub-regions which have been assigned for the migration operation. As a next step, the RAID controller initiators lock the respective sub-regions of storage activity, which is outside the scope of the migration activity (step 72). Contemporaneously, the RAID controllers operate to establish a mirroring relationship for write data updates between the source device and the target device of the migration operation (step 74). The RAID controller then writes data to the source device for all writes (step 76) and to the target device when data is targeted to an area of the target device that has already been written to by the migration operation (step 78). The RAID controller then assigns a designated SESP in the respective storage device fabric to perform the migration operation (step 80). To perform the migration operation, the SESP reads data from a designated source storage device sub-region (step 82) and writes the data to an identical location on the target storage device (step 84). The method 64 then ends (step 86).

Software and/or hardware to implement the method 64 previously described, such as the described assignment of a respective SESP in the storage device fabric to perform the migration operation, can be created using tools currently known in the art. The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of providing for data migration in a computing environment having storage systems and subsystems as described, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of migrating data from a source device to a target device in a storage system, comprising:
   dividing a capacity of the source device into a plurality of sub-regions by a controller;
   locking the sub-regions from storage activity by the controller;
   establishing a mirroring relationship for write data updates between the source device and the target device by the controller;
   writing second data to the plurality of sub-regions in the source device by the controller;
   writing a first portion of the second data to first corresponding sub-regions in the target device if the first corresponding sub-regions have previously had first data copied from the plurality of sub-regions;
   assigning a local processor to copy a second portion of the second data from the source device to second corresponding sub-regions in the target device by the controller if the second corresponding sub-regions have not previously had first data copied from the plurality of sub-regions; and
   copying the second portion of the second data from the source device to second corresponding sub-regions in the target device, wherein copying comprises:
      reading data from one of the plurality of sub-regions by the local processor; and
      writing data to an identical location on the target device by the local processor, wherein the steps of establishing the mirroring relationship for write data updates between the source device and the target device and locking the sub-regions from storage activity are performed in parallel.

2. The method of claim 1, further including, subsequent to the step of dividing the capacity of the source device into a plurality of sub-regions, informing a peer redundant array of independent disks (RAID) controller of which of the plurality of sub-regions is assigned to be copied.

3. The method of claim 1, wherein the local processor further comprises a SCSI Enclosure Services processor (SESP).

4. The method of claim 1, wherein the local processor is resident within a local port domain of the storage system.

5. The method of claim 1 wherein each of the plurality of sub-regions further comprises a Logical Block Address (LBA) range.

6. The method of claim 1, wherein dividing a capacity of the source device into a plurality of sub-region is performed by a redundant array of independent disks (RAID) controller operating within a local domain of the storage system.

7. A system for data migration between a source device and a target device in a storage system, comprising:
   a processor operational within a local domain of the storage system; and
   a redundant array of independent disks (RAID) controller electrically connected to the processor, wherein the RAID controller:
      divides a capacity of the source device into a plurality of sub-regions;
      locks the sub-regions from storage activity;
      establishes a mirroring relationship for write data updates between the source device and target device,
      writes second data to the plurality of sub-regions in the source device by the controller;
      writes a first portion of the second data to first corresponding sub-regions in the target device if the first corresponding sub-regions have previously had first data copied from the plurality of sub-regions;
      assigns the processor to copy a second portion of the second data from the source device to second corresponding sub-regions in the target device by the controller if the second corresponding sub-regions have not previously had first data copied from the plurality of sub-regions,
      wherein the establishing the mirroring relationship for write data updates between the source device and the target device and the locking the sub-regions from storage activity are performed in parallel, and
      wherein the processor is configured for copying the second portion of the second data from the source device to second corresponding sub-regions in the target device, the copying comprising:
         reading data from one of the plurality of sub-regions by the local processor; and
         writing data to an identical location on the target device by the local processor.

8. The system of claim 7, wherein, subsequent to the operation of assigning the processor to copy data from the source device to the target device, the processor reads data from one of the plurality of sub-regions and writes the data to an identical location on the target device.

9. The system of claim 7, wherein the RAID controller informs a peer redundant array of independent disks (RAID) controller of which of the plurality of sub-regions is assigned to be copied.

10. The system of claim 7, wherein the processor further comprises a SCSI Enclosure Services processor (SESP).

11. The system of claim 7, wherein the processor is resident within a local port domain of the storage system.

12. The system of claim 7, wherein each of the plurality of sub-regions further comprises a Logical Block Address (LBA) range.

13. An article of manufacture including code stored in a non transitory medium for migrating data from a source device to a target device in a storage system, wherein the code is capable of causing operations to be performed comprising:
   dividing a capacity of the source device into a plurality of sub-regions by a controller;
   locking the sub-regions from storage activity by the controller;
   establishing a mirroring relationship for write data updates between the source device and the target device by the controller;

writing second data to the plurality of sub-regions in the source device by the controller;

writing a first portion of the second data to first corresponding sub-regions in the target device if the first corresponding sub-regions have previously had first data copied from the plurality of sub-regions;

assigning a local processor to copy a second portion of the second data from the source device to second corresponding sub-regions in the target device by the controller if the second corresponding sub-regions have not previously had first data copied from the plurality of sub-regions; and copying the second portion of the second data from the source device to second corresponding sub-regions in the target device, wherein copying comprises:

reading data from one of the plurality of sub-regions by the local processor; and writing data to an identical location on the target device by the local processor, wherein the steps of establishing the mirroring relationship for write data updates between the source device and the target device and locking the sub-regions from storage activity are performed in parallel.

14. The article of manufacture of claim 13, further including subsequent to the step of dividing the capacity of the source device into a plurality of sub-regions, informing a peer redundant array of independent disks (RAID) controller of which of the plurality of sub-regions is assigned to be copied.

15. The article of manufacture of claim 13, wherein the local processor further comprises a SCSI Enclosure Services processor (SESP).

16. The article of manufacture of claim 13, wherein the local processor is resident within a local port domain of the storage system.

17. The article of manufacture of claim 13, wherein each of the plurality of sub-regions further comprises a Logical Block Address (LBA) range.

* * * * *